United States Patent

Feldman et al.

[11] Patent Number: 6,148,000
[45] Date of Patent: Nov. 14, 2000

[54] MERGING OF DATA CELLS AT NETWORK NODES

[75] Inventors: Nancy Karen Feldman, Nanuet; Arun Viswanathan, White Plains, both of N.Y.; Richard M. Woundy, North Reading, Mass.; Richard H. Boivie, Monroe, Conn.

[73] Assignee: International Business Machines Corporation, Armonk, N.Y.

[21] Appl. No.: 08/941,427

[22] Filed: Sep. 30, 1997

Related U.S. Application Data

[60] Provisional application No. 60/027,850, Oct. 2, 1996.

[51] Int. Cl.[7] .................................................. H04L 12/28
[52] U.S. Cl. ........................ 370/397; 370/395; 370/394
[58] Field of Search .................................. 370/394, 352, 370/395, 397, 400, 409, 411, 392, 342, 343, 344, 357

[56] References Cited

U.S. PATENT DOCUMENTS 5,583,868  12/1996  Rashid et al. ............................ 370/394
5,715,250   2/1998  Watanabe ................................ 370/395
5,768,271   6/1998  Seid et al. .............................. 370/397

*Primary Examiner*—Chi H. Pham
*Assistant Examiner*—Brenda H. Pham
*Attorney, Agent, or Firm*—McGinn & Gibb, P.C.

[57] ABSTRACT

A switching apparatus (and method and program storage device for storing the method) for receiving and transmitting data units each segmented into a series of cells of data, including a first cell and a last cell, each cell of a series including a label common to all cells of said series, includes at least one incoming port for receiving cells of a plurality of series at each incoming port, at least one outgoing port for transmitting cells out of the apparatus with an outbound label, a storage device for storing a series of cells received at each incoming port until the last cell of the series is received, and, a device for transmitting each of the series of cells sequentially from the first cell to the last cell from the storage device to a selected outgoing port. Each cell of each series has an outbound label common to all cells of the series, and all cells of each of the series are transmitted before transmitting any cells of other series having the same outbound label.

22 Claims, 7 Drawing Sheets

MERGING OF DATA CELLS AT NETWORK NODES

CROSS-REFERENCE TO RELATED APPLICATIONS

The present application claims priority to co-pending U.S. provisional application No. 60/027,850 filed Oct. 2, 1996.

DESCRIPTION

TECHNICAL FIELD

The present patent application concerns a scheme using standard IP routing protocols as the basis for switching IP datagrams, packets, frames, and other data units in switching environments, such as an asynchronous transfer mode (ATM) environment for example, with the addition of a novel and inventive virtual circuit establishment protocol. This protocol leverages the advantages of ATM (e.g. high performance, high capacity, support for real-time services) in an Internet network without the complexities that normally accompany standard ATM and IP-over-ATM, including ATM user-network interface (ATM UNI), ATM Address Resolution Protocol (ATMARP), Next Hop Routing Protocol (NHRP), and Private Network Network Interface (PNNI) routing integration.

BACKGROUND OF THE INVENTION

Data communication is a fundamental part of computing. Networks transport information all over the world and connect a huge number of computers. In particular those networks which are based on the Internet protocol (IP) are developing fast. IP based networks use a number of different IP routing protocols, including routing information protocol (RIP; cf. request for comments (RFC) 1058), open shortest path first (OSPF; cf. RFC 1583), Intermediate System-to-Intermediate System (IS-IS; cf. ISO 10589), Distance-Vector Multicast Routing Protocol (DVMRP; cf. RFC 1075), and Border Gateway Protocol (BGP; cf. 1771), to determine how packets ought to be routed. Among these protocols, OSPF and BGP are Internet Engineering Task Force (IETF) recommended standards that have been extensively deployed and exercised in many networks.

There is a large demand for networks, systems and protocols that would combine asynchronous transfer mode schemes with IP routing protocols. Because of its inherent complexity, ATM is at the moment mainly employed for high performance, high capacity communication, and in particular for real-time services.

SUMMARY OF THE INVENTION

The present invention concerns a novel and inventive virtual circuit establishment protocol and implementations thereof.

Special implementations of the present invention in an ATM switching environment leverage the advantages of ATM in an Internet network without the complexities that normally accompany standard ATM.

There are different important aspects of the inventive protocol and implementations in an ATM switching environment:

creation of loop-free VC trees;

appearance of a standard IP network, including time to live (TTL) decrement, is useful for debugging such as traceroute;

using OSPF router IDs (or other link-state protocol router labels) to aggregate VCs;

using egress identifiers gives the flexibility of different levels of VC aggregation.

VC conservation by merging and aggregating VCs due to the use of egress identifiers;

simple way of creating ATM VCs or switching paths without using ATM signalling.

The inventive scheme uses far fewer VCs single VC to a destination network (rather than srchost-to-desthost "session" based VCs);

"VC tree" rather than $O(n^2)$ VCs between egress points ($O(n)$ rather than $O(n^2)$ VC's);

Many destination networks behind an "egress point" can be served by a single VC tree.

The inventive scheme requires much less VC setup overhead:

fewer VCs to be set up;

VC set up occurs only when routing changes (not whenever a new TCP connection starts up) Please note: a single web page with a lot of images leads to a lot of TCP connections.

The inventive scheme switches a higher proportion of the total traffic all the traffic within a flow (It does not forward the initial packets in each flow to the network layer);

switches all the flows (not just a limited number of "long lasting" flows).

Last but not least, the present invention scales to much larger networks.

Specifically, the invention herein relates to merging of data units, such as cells, at a network node. In the context of the present invention, it shall be understood that data units are divided into series of "cells" which are each generally smaller than the data unit (e.g. datagram, packet, frame, etc.) from which they are taken. Moreover, "cells" according to the present invention may be of either varying size within such a series and from series to series, or they may be of a constant size, such as ATM cells, which have a fixed size of 53 bytes.

Some switching technologies, such as ATM, segment the user data units into smaller native data units (cells) before transmitting the data into a network. However, the segmented cells do not carry sufficient information, as in IP fragmentation, to reassemble back the user frame with any cell order. This precludes switched paths from being merged into one (aka. the "cell interleaving"). Due to this fact, such networks require order N-squared (where N is the number of edge nodes) number of connections to connect each edge node to every other edge node in the network.

An important objective of this inventive proposal is to enable merging in such networks, thereby greatly reducing the number of connections. With merging, only order N connections are required to connect each edge node to every other edge node in a network. A major advantage of this method is that less connection resources are used for full connectivity and also less work is required to set up and tear down these connections.

The invention is explained in terms of an ATM network, but the core concepts can be applied to other similar technologies. Two types of merging techniques are introduced: Virtual Path merge (VP-merge) or Virtual Connection merge (VC-merge).

VP-merge can be used in an ATM network that is capable of Virtual Path switching. In this, a multipoint-to-point switched path is established using Virtual Paths, where all the ingress nodes are at the leaves and the egress node is at the root of the tree. Several innovative schemes can be used to avoid the cell interleaving problem at the merge points in the multipoint-to-point tree. Each ingress node is assigned a unique VCI value to use when injecting data into the switched path. The VCI value can either be uniquely configured, or dynamically assigned through in-band or out-of-band signalling. If the root node is cognizant of all ingress nodes, it can assign a unique VCI value to each of the ingress nodes.

Another mechanism can be used in combination with root-based set up procedure, in which, the VCI space within a VP is algorithmically partitioned for each upstream neighbor as the switched path grows from the egress towards the leaves. IP networks using Class B or C IPv4 addressing schemes can use the least significant two bytes (lower 16 bits) of the IPv4 address as the unique VCI value.

In the case of VC-merge, multiple upstream Virtual Circuits (VC) are merged into a single downstream VC. If the VC is using the AAL5 encapsulation scheme, every last cell of the AAL5 frame is marked. This marking can be used to collect (buffer) all the cells from an upstream VC till the last one arrives and then ship all the cells from a particular upstream VC into a downstream VC while maintaining the contiguity of cells. Similarly, the cells from a upstream VC can also be reassembled and then injected into a downstream VC, which can be useful when some upper layer processing is required.

The merging invention herein therefore provides a switching apparatus for receiving and transmitting data units each segmented into a series of cells of data, including a first cell and a last cell, each cell of a series comprising a label common to all cells of said series, said apparatus comprising:

a) at least one incoming port for receiving cells of a plurality of series at each incoming port, b) at least one outgoing port for transmitting cells out of the apparatus with an outbound label, c) a storage device for storing a series of cells received at each incoming port until the last cell of said series is received, and, d) a device for transmitting each said series of cells sequentially from first cell to last cell from said storages device to an outgoing port, each cell of each series having an outbound label common to all cells of said series, all cells of each said series being transmitted before transmitting any cells of other series having the same outbound label.

Preferably, cells of a series are stored in said storage device only while the selected outgoing port is busy transmitting cells of other series with the same outgoing label.

In a preferred embodiment, the novel apparatus comprises:

a) at least one incoming port for receiving cells of a plurality of series at each incoming port;

b) at least one outgoing port for transmitting cells out of the apparatus, c) a storage device for storing and reassembling a series of cells received at each incoming port until the last cell of said series is received, and, d) a switch device for switching said reassembled cells from said storage device to an outgoing port.

According to another preferred embodiment, the novel apparatus comprises:

a) at least one incoming port for receiving cells of a plurality of series at each incoming port;

b) at least one outgoing port for transmitting cells out of the apparatus, c) a switch device for switching cells to an outgoing port selected according to a label common to all cells of said series, d) a storage device for storing and reassembling a series of cells received at each outgoing port until the last cell of said series is received, and, e) a transmitter for then transmitting said reassembled cells from said apparatus on said outgoing port.

According to the invention, the data units can, for example be IP packets, AAL5 frames, data-link layer frames, or frame-relay frames, or the like. Preferably, the cells into which data units are divided may be ATM cells, cells of different sizes, data-link layer frames, frame-relay frames, or the like.

The invention also provides a method of creating a multipoint-to-point switched connection within a network of nodes to switch data units using labels, wherein a node comprises a plurality of incoming ports, at least one outgoing port, and a switching database, said method comprising the steps of:

a) said node assigning a single outgoing label on an outgoing port for said switched connection, b) said node assigning an incoming label on a plurality of incoming ports for said switched connection, c) said node creating an entry in the switching database between each said incoming label and said outgoing label.

It is preferred that the switched connection is a concatenation of ATM Virtual Channels (VCs), while the aforesaid label comprises a Virtual Path Identifier (VPI) and a Virtual Channel Identifier(VCI), and the aforesaid data unit is an ATM cell.

In a preferred embodiment of the aforesaid method, the switched connection is a Frame Relay connection, the label comprises a Data-Link Control Identifier (DLCI), and the data unit is a Frame Relay frame.

The invention further provides a method of using a Virtual Path (VP) switched connection in a multipoint-to-point connection to switch a series of cells in a network of nodes using a label, wherein said label comprises a Virtual Path Identifier (VPI) and a Virtual Channel Identifier(VCI), and wherein each node which is to initiate data on said VP switched connection is assigned a Virtual Channel Identifier (VCI) unique within said network, comprising the steps of:

a) a node initiating data on said VP switched connection transmits cells with said unique VCI value and the assigned VPI value for said connection, b) each node in said network along said switched connection switches cells based solely on said VPI value, keeping the VCI value unaltered.

In the latter method, the unique VCI identifier is derived from the lower 16 bits of a class B or C IP version 4 address on said node, and wherein all nodes in said network belong to the same class B or C network.

The present invention also provides a program storage device readable by a computing machine, tangibly embodying a program of instructions executable by the machine to perform method steps of each inventive method of the present invention. As will be understood, such program storage devices may include magnetic tapes, discs, hard drives, ROM and EPROM storage, and the like.

DESCRIPTION OF THE DRAWINGS

The invention is described in detail below with reference to the following schematic drawings.

DETAILED DESCRIPTION OF THE PRESENT INVENTION

Figure 1:
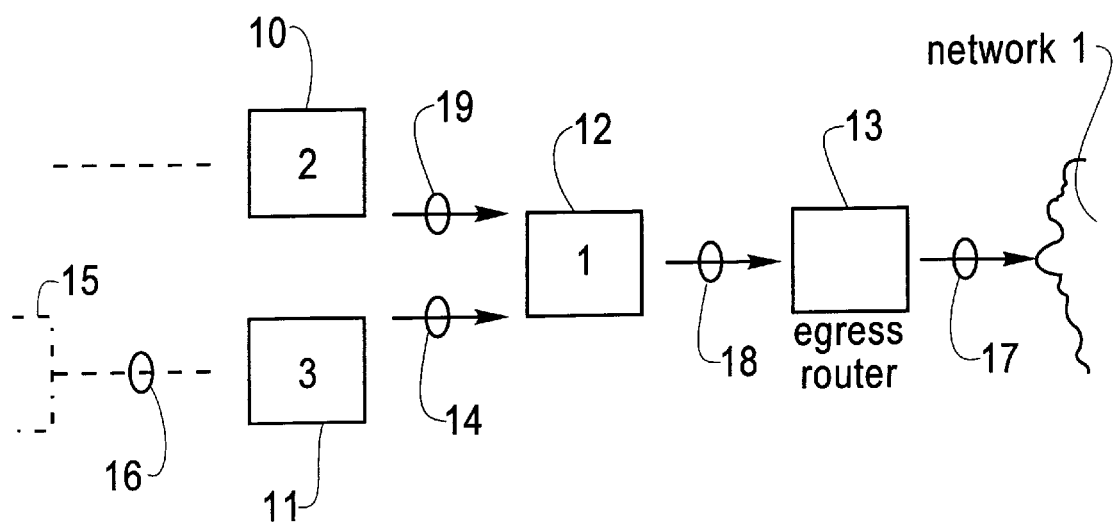
FIG. 1 is a schematic block diagram used to illustrate how an egress router initiates the VC Establishment, according to the present invention.

In the following, the ATM data transmission technology will be used to explain the present invention in detail, i.e., ATM specific terms such as 'virtual circuit' 'virtual path', 'VPIs' and 'VCIs' will be used. It is, however, to be noted that the inventive concept can be used for any other kind of switched path data transmission system, such as Frame Relay, X25, and the non-ATM tag switching environment proposed and described by B. Davie et al., CISCO Systems Inc., in the two Network Working Group Internet Drafts with titles "Tag Switching Architecture Overview" and "Tag Distribution Protocol", both of September 1996. The inventive protocol can be used as signalling protocol for the frame forwarding part of the tag switching approach described in the above two documents.

In the present context, an Integrated Switch Router (ISR) is a standard IP router that has been augmented with ATM virtual circuit (VC) switching support hard- and/or software. According to the present invention, the ISR at an entry point to an ATM switching environment performs standard IP forwarding of datagrams, but the 'next hop' of the IP forwarding table (herein referred to as forwarding information base) has been extended to include a reference to a VC. General details on Internet Protocol (IP) datagram and the routing of such datagrams are given in chapters 7 and 8 of the text book "Internetworking with TCP/IP", 2nd Edition, Volume I, Principles, Protocols, and Architecture, by Douglas E. Comer, Prentice Hall, Englewood Cliffs, N.J., for example.

When referring to routers and Integrated Switch Routers (ISRs) in the present content, any kind of system is meant which is capable of interconnecting two adjacent computers, two adjacent networks comprising several computers, or any combination thereof. Usually, a router is a computer having some additional hardware and software to handle router specific tasks. It is to be noted that standard routers and ISRs, according to the present invention, can coexist within one network domain. However, the network routing domain has the greatest performance and VC conservation when all routers in the domain are ISRs, as will be described later.

The word 'adjacent' is not used in the pure geographical sense but in a logical sense. Two adjacent systems being miles apart may be deemed to be adjacent to each other if they are directly interconnected.

The expression 'network' is used the same way as it is used by the TCP/IP Internet protocol, where all networks are treated equally. A local area network (LAN), a wide area network (WAN), or a point-to-point link between two systems, hereinafter each count as a network.

A domain is a general grouping of network devices (routers).

Each VC may have an endpoint at a neighboring router (comparable to today's IP next hops on conventional routers), or may traverse a series of ISRs, switched along the best IP forwarding path, to an egress ISR endpoint. This allows datagrams to be switched at hardware speeds through an entire ISR network.

A 'VC' is a logical circuit created to ensure reliable communication between two network devices (e.g. routers) in a network.

The protocol described and claimed herein and the implementations thereof are based on a number of assumptions about the traffic characteristics of the network, which is reflected in the capabilities of the VCs it establishes. It is assumed that the traffic flow in a network is dominated by best-effort, hop-by-hop forwarded datagram protocols, such as in an IP network. However, the present protocol attempts not to be too IP protocol-specific, by also supporting protocols like version 6 of the Internet protocol (IPv6), for example. The VCs that the present protocol forms are simplex, matching the nature of IP datagrams.

The key link between the IP network routing protocols and the VC establishment according to the present invention is the so-called 'egress identifier'. The egress identifier refers to an egress ISR that forwards traffic either to a foreign routing domain, or across an area boundary within the same network. The present protocol establishes VCs to/towards each unique egress identifier. Since thousands of IP destinations can map to the same egress identifier, the inventive protocol minimizes the number of VCs required in an ISR network. This allows a large network to switch all of its IP traffic, resulting in improved aggregate IP throughput.

According to the present invention, egress ISRs initiate the setup of VCs by sending 'VC Establishment' messages to their upstream ISR neighbors typically within the same domain. These upstream neighbors forward the messages to their own upstream neighbors in Reverse Path Multicast style after ensuring that the VC path is loop-free. Details about Reverse Path Multicast can be found in chapter 11.3 of the book "Routing in the Internet", by Christian Huitema, Prentice Hall PTR, Englewood Cliffs, N.J. 07632. and in S. Deering's Ph.D. thesis with title "Multicast Routing in a Datagram Internetwork", Stanford University, CA, 1991. Eventually, all ISRs establish VCs to all egress ISRs.

The VC to an egress point, in general, takes the form of a tree. A tree results because of the 'merging' of VCs that occurs at a node (ISR) when multiple upstream VCs for a given egress point are 'spliced' to a single downstream VC for that egress point.

VC Conservation

An important goal of the present protocol and its implementations is to minimize the number of VCs or switching paths required by ISRs to switch all IP traffic in a switching domain. Since ATM switching uses a fixed-length VPI/VCI identifier, the number of distinguishable VCs on a switch interface has an upper bound. Further, some ATM components can only support a portion of the VPI/VCI range at any instant. Since VPI/VCI space is limited, the inventive protocol restrains its VC consumption so that VCs are available as needed for its own use, as well as for ATM services, and other applications, such as Resource Reservation Protocol (RSVP).

Further benefits include simplification of network management, both for automated tools and for human comprehension and analysis, and VC-setup overhead minimization.

The consumption of VCs is restrained
by the use of egress routers that may map thousands of IP destinations to the same VC, and
by enabling the merging of VCs.

The network routing domain has the greatest performance and VC conservation when all routers in the domain are ISRs. Maximum benefits using the present protocol are also tied closely to an IP network routing topology with a high ratio of IP destinations to egress ISRs, as exists in a typical IP backbone. However, the inventive protocol is flexible enough to be highly beneficial even in networks with partial ISR deployments or arbitrary network routing topologies.

The ability of the present protocol to conserve the number of VCs depends on the hardware capabilities of the ISR. Some ATM switching components can 'merge' multiple inbound VCs onto one outbound VC at close to standard switching rates. These merge-capable components are able to reassemble cells from the inbound VCs into frames, and inject the frames into the outbound VC, without interleaving cells from different frames. This reassembly and -segmentation is necessary because ATM adaptation layer (AAL5) processing depends on the consecutive delivery of cells within a single frame, since each cell does not uniquely identify the frame to which it belongs.

Loop Prevention

The inventive protocol guarantees that VC loops are prevented, even in the presence of transient IP routing loops, as will be addressed below. Usually, each hop decrements the time-to-live (TTL), so traffic is eventually dropped. Details on TTL are given in chapter 7 of Douglas E. Comer text book (mentioned above).

ATM switching, however, does not have a counter similar to the TTL, so traffic persists in a VC loop as long as the VC loop exists. At best, the traffic in the VC loop steals bandwidth from other Unspecified Bit Rate (UBR) VCs; at worst, the traffic interferes with IP routing traffic, slows down routing convergence, and lengthens the life of the VC loop.

The inventive protocol avoids creating VC loops by the use of an integrated switch router identifier (ISR ID) list, similar in function to the BGP AS_PATH ('AS' stands for Autonomous System) attribute. It is the main difference between the present approach and the known BGP AS_PATH approach, that the latter is done for each autonomous system, whereas we add an ISR ID to the identifier list for each ISR the traffic goes through. According to the present invention, each ISR in the VC establishment path appends its own unique ISR ID to each message it forwards.

In this way, an ISR is able to determine the path a message has traversed, and can ensure that no loops are formed. If a message gets looped around, an ISR would find its own ISR ID in the accumulated ID list. The respective ISR may then drop the message, or take any other action to prevent the loop detected.

Further, if an ISR modifies or deletes an egress due to an IP route change, or receives a message that modifies an existing VC to an egress, the ISR must unsplice any established upstream VC from the downstream VC. This unsplicing forces inbound traffic to be forwarded at the IP network layer, so that transient IP routing loops, potentially created by the route change, cannot produce VC loops. The ISR must then re-establish a new VC to the modified egress, by the use of the 'VC Trigger' message described later. Note that the present protocol does not attempt to suppress transient IP routing protocol loops; it only avoids establishing VC loops with this information.

An exemplary implementation of the inventive protocol uses the following set of messages to manage the ISR switching cloud. It is to be noted that the names of the messages have been assigned for sake of simplicity only. Other names can be used instead.

'VC Init'

This is the first message sent by an ISR to each of its neighbors, as notification of its existence. 'VC Init' is periodically transmitted until a positive 'VC Acknowledgment' message or a 'VC KeepAlive' is received. The 'VC Init' message may include the neighbor timeout period, and other adjacency information.

'VC KeepAlive'

This message is sent by an ISR to inform its neighbors of its continued existence. It is the first message that is transmitted after initialization. In order to prevent the neighbor timeout period from expiring, the 'VC KeepAlive' messages must be periodically sent to neighbors. The 'VC KeepAlive' need only to be sent when no other protocol messages have been transmitted within the periodic interval time.

'VC Establishment'

This message is initiated by the egress ISR, and is periodically sent to each upstream neighbor to setup or refresh a VC. It is also sent by any ISR in response to a 'VC Trigger' message. Each ISR that receives a 'VC Establishment' message for an egress identifier must verify that the path is correct and loop free. If the 'VC Establishment' message changes a previous known VC path to the egress identifier, the ISR unsplices the obsolete VC. The ISR creates a downstream VC for the egress identifier, and replies with a 'VC Acknowledgment' message. It then creates a VC for each of its upstream neighbors, forwards the 'VC Establishment' message to the upstream neighbors with the VC label (VPI/VCI) and its unique ISR ID appended to the ISR ID path, and waits for a 'VC Acknowledgment' message. According to the present invention, this pattern continues until all ISRs are reached.

'VC Trigger'

This message is sent by an ISR when it has detected that an IP routing change has modified its path to the egress identifier. After unsplicing the obsolete VC, the ISR sends a 'VC Trigger' message to its new downstream neighbor requesting a 'VC Establishment' message.

'VC Teardown'

This message is sent when an ISR has lost, or believes to have lost all connectivity to an egress identifier, or when a downstream node to an egress identifier has become an upstream node due to routing changes. In the former case, the 'VC Teardown' message will traverse the upstream ISR paths of the VC, unsplicing each VC along the way. In the latter case, the 'VC Teardown' message will be sent single hop to the new upstream (previously downstream) node, unsplicing the obsolete VC.

'VC Acknowledgment'

This message is sent as a response to 'VC Init', 'VC Establishment', 'VC Trigger', and 'VC Teardown" messages. When an ISR receives a positive 'VC Init' acknowledgment, it responds with a 'VC KeepAlive' message. When an ISR receives a positive 'VC Establishment' acknowledgment, it splices the upstream VC to the downstream VC.

ISR Information Bases

According to a favorable implementation of the present invention, the ISR needs three logical information bases to compute routes and forward datagrams: the routing information base (RIB), the forwarding information base (FIB), and the VC information base (VCIB).

The first, the RIB, is used for the computation of best-effort routes by various IP routing protocols. According to the present invention, the RIB for the ISR is essentially unchanged from the RIB on a standard router. In the ISR context, the RIB may also be used to identify egress points and egress identifiers for the other two information bases.

According to the present invention, the FIB of the ISR has been extended beyond the content of the FIB on a standard router to include an egress identifier in each next hop entry. The FIB tends to contain many IP destination prefix entries, which point to a small number of next hop entries that describe the hop-by-hop forwarding operation(s). Next hop entries on the ISR at least consist of an outgoing interface, next hop IP address, and egress identifier. This association of the next hops with the egress identifiers is the responsibility of the routing protocols.

The proposed VCIB, which does not exist on a standard router, contains the entries that map each unique next hop/egress FIB entry to established VCs. This mapping is controlled by the inventive protocol. The implementation of the VC information base (VCIB) may be consolidated with the routing and forwarding information bases in the ISR, for better forwarding efficiency.

Egress Identifiers

According to the present invention, egress identifiers are used that balance the desire to share the same egress identifier among many IP destination prefixes, with the desire for ease of computation by the standard IP routing protocols. To provide flexibility, the present protocol supports many types of egress identifiers. ISRs choose the type of egress identifier to use, based on routing protocol information and local configuration.

The first type of egress identifier is the IP destination prefix. This type results in each IP destination prefix sustaining its own VC tree, and thus will not scale in large backbone and enterprise networks. However, this is the only information that some routing protocols, such as routing information protocol (RIP), can provide. This type of identifier may work well in networks where the number of destination prefixes is limited, such as in campus environments, or even in a wide-area network of a private enterprise.

The second type of egress identifier is the egress IP address. This type is used primarily for BGP protocol updates, which carry this information in the NEXT_HOP attribute. There are certain types of OSPF routes that also use this type. More detailed information is given in the sections headed "BGP Interaction" and "OSPF Interaction".

The third type of egress identifier is the 'OSPF Router ID' (router label), which allows aggregation of traffic on behalf of multiple datagram protocols routed by OSPF. The latest version of OSPF, OSPFv3, supports the Router ID for both IP and IPv6. Further information is given in the section with title: "OSPF Interaction". Please note that the 'OSPF Router ID', according to the present invention, can be used for traffic aggregation within the tag distribution protocol described in the two mentioned Internet Draft documents by Davie et al.

The (source, group) pair, used for multicast protocols, such as Distance Vector Multicast Routing Protocol (DVMRP), Multicast Open Shortest Path First (MOSPF), and Protocol Independent Multicast (PIM). The fifth is the (ingress-of-source, group), used for such multicast protocols as MOSPF and PIM. See section "IP Multicast Interaction" for IP multicast protocol details.

Other egress ID types may be defined, including but not limited to IS-IS NSAP addresses, NLSP IDX addresses, IPv6 destination prefixes etc.

An egress identifier hierarchy may be introduced to allow more flexible control over egress identifier selection. This allows a router, according to the present invention, to autolearn or be configured with non-default egress identifiers, and to select which egress identifiers to use in various routing situations.

It should be noted that a network achieves performance optimization with the present protocol when egress identifiers refer to the next hop router of the egress ISR. This allows datagrams to be switched entirely from the ingress point in the routing domain to the router past the egress ISR.

Egress ISRs

In the present protocol, 'VC Establishment' messages are originated from the egress ISR. An ISR is considered an egress ISR, with respect to a particular egress identifier, under any of the following conditions:

The egress identifier refers to the ISR itself (including one of its directly attached interfaces).

The egress identifier is reachable via a next hop router that is outside the ISR switching infrastructure.

The egress identifier is reachable by crossing a routing domain boundary, such as another area for OSPF summary networks, or another autonomous system for OSPF AS ('AS' stands for autonomous system) externals and BGP routes.

VC Establishment Initiation Example

In the following, an example for the establishment of a VC, according to the present invention, is given. Details are illustrated in FIG. 1.

The egress router 13 learns of an egress identifier that indicates the egress is itself (see "Egress ISRs"). It creates a FIB entry for its next hop and egress identifier (itself), as well as a corresponding VCIB entry with a default VC (label 17) to the next hop.

The egress router 13 creates an upstream VC (label 18) to ISR1 12, and initiates a 'VC Establishment' message with the upstream VC label 18 (VPI/VCI) and itself in the ISR ID path.

IRS1 12 verifies that the 'VC Establish' message was received from the expected next hop 13 (egress router) by matching its FIB entry, and that the ISR ID path is loop free. It then creates a downstream VC (label 18) to the egress router 13 with the given VC label, replaces the default VC in the VCIB with this new value, and replies to the egress router 13 with a 'VC Acknowledgment' message.

The egress router 13 receives the 'VC Acknowledgment' message and splices its ISR1 upstream VC (label 18) to its downstream VC (label 17).

ISR1 12 creates an upstream VC (labels 14 and 19) to each of its upstream neighbors, ISR2 10 and ISR3 11. It forwards the 'VC establishment' message to each upstream neighbor 10 and 11, with the VC labels 14 and 19 to use, and appends its own ISR ID to the ISR ID path.

When ISR1 12 receives each 'VC Acknowledgment' from each upstream neighbor 10 and 11, it splices the corresponding upstream VC 14 and 19 to its egress downstream VC 18.

All upstream nodes recursively follow the same procedures as ISR1 12, until all Ingress nodes have been added to the VC path to the egress router 13. Reference number 15 illustrates an upstream ISR4 and reference numeral 16 illustrates a VC label to append to a message from ISR4 15.

In the present context, splicing means that two VCs are joined at the ends such that traffic from an upstream VC is switched into a downstream VC.

The egress router 13 is responsible for periodically sending refresh 'VC Establishment' messages, to prevent VC timeouts. If a refresh is not received in the allotted time, VCs are unspliced and discarded. The refresh period may be included in each 'VC Establishment' message.

Figure 3:
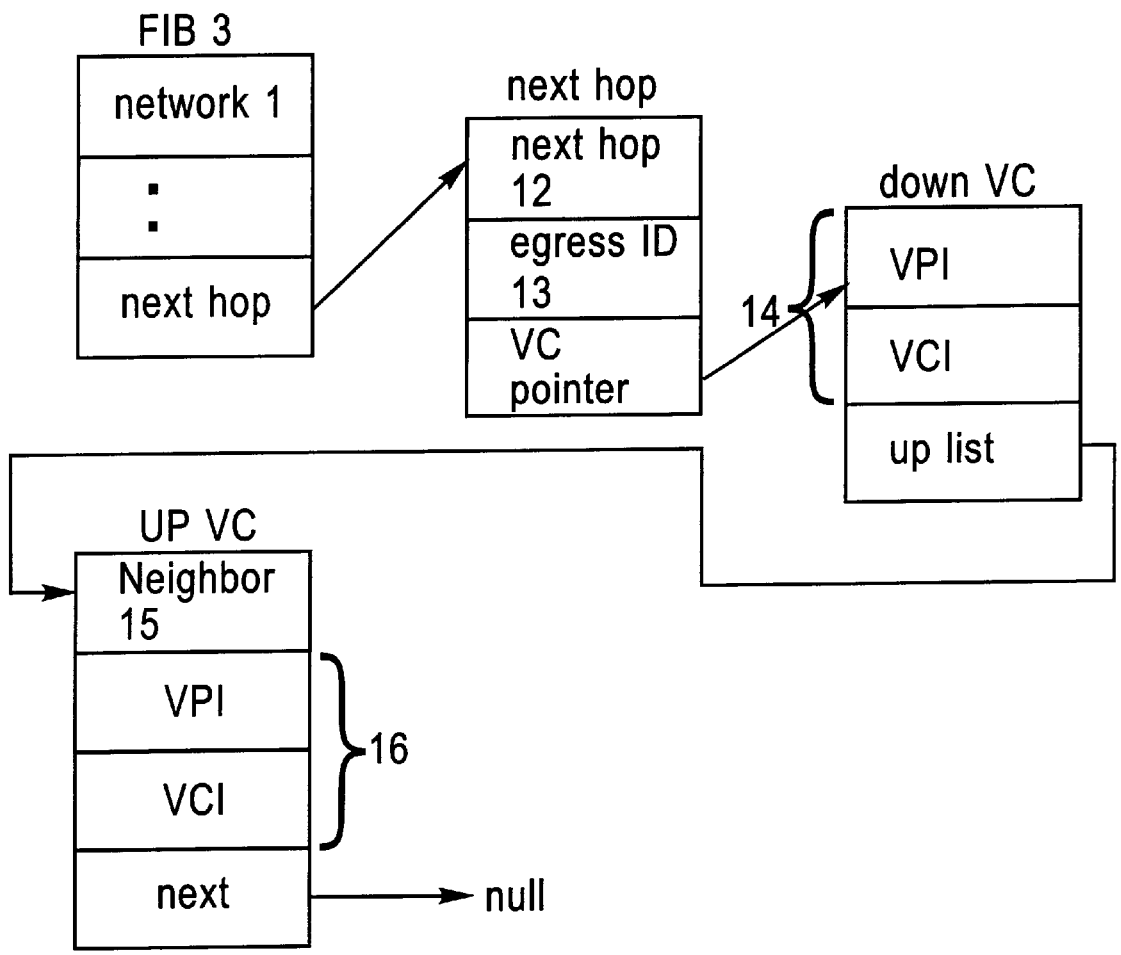
FIG. 3 is a schematic illustration of a forwarding information base (FIB) kept and maintained in ISR 3 of FIG. 1.
Figure 4:
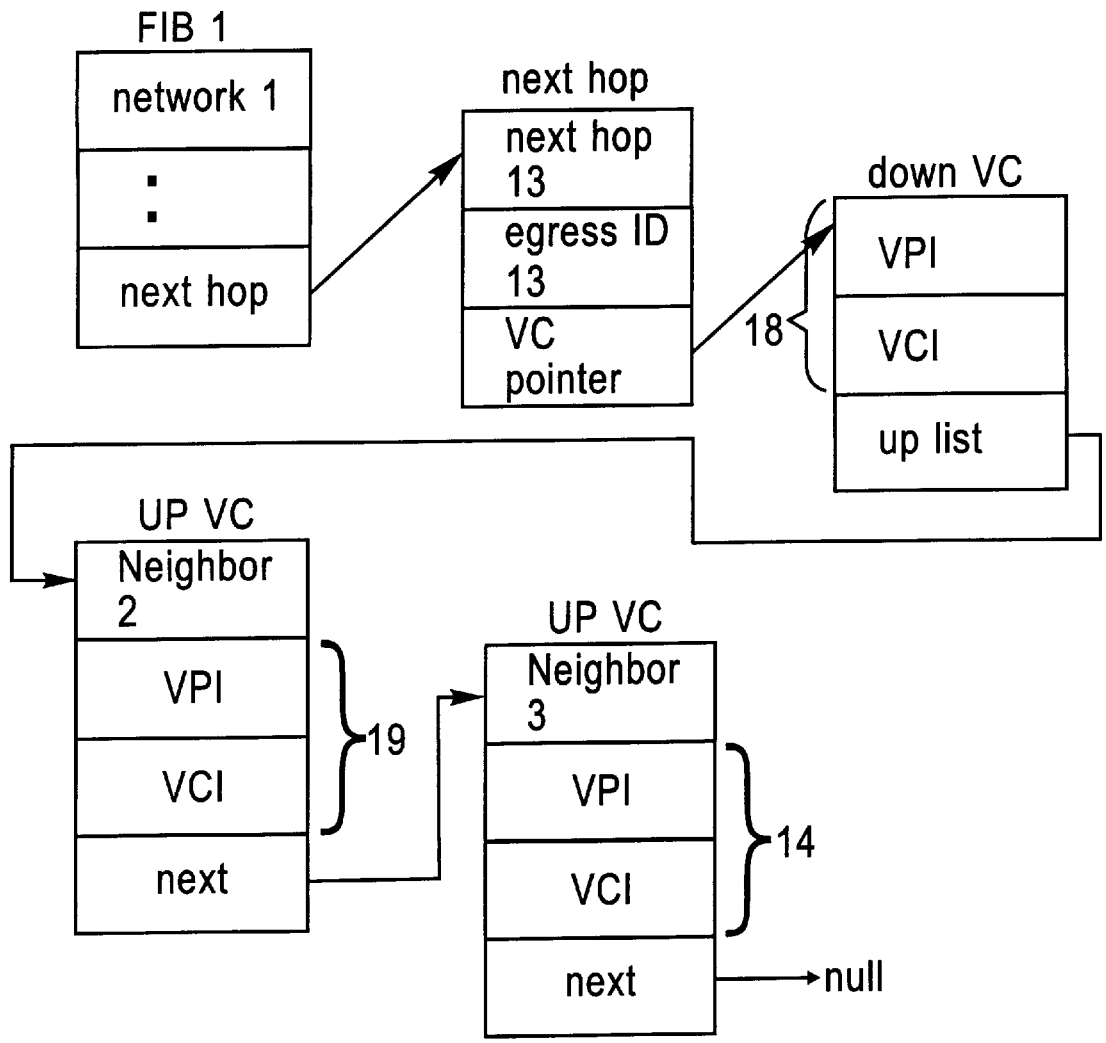
FIG. 4 is a schematic illustration of a forwarding information base (FIB) kept and maintained in ISR 1 of FIG. 1.

A schematic illustration of a forwarding information base (FIB) kept and maintained in ISR 3 of FIG. 1 is given in FIG. 3. The FIB kept and maintained in ISR 1 of FIG. 1 is shown in FIG. 4.

VC Establishment Trigger Example

Figure 2:
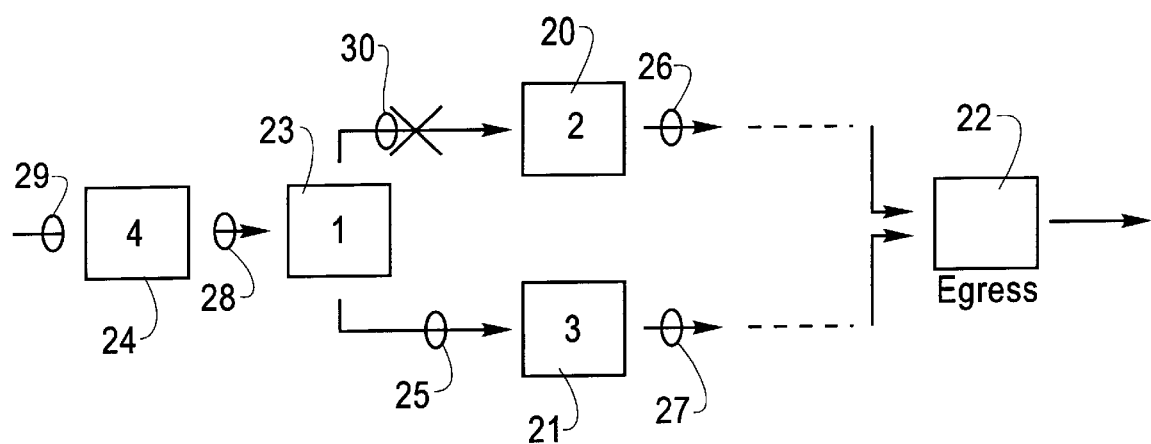
FIG. 2 is a schematic block diagram used to illustrate how an old VC will be teared down and a new VC will be established, according to the present invention.

An example for the use of the 'VC Establishment' trigger is now given with reference to FIG. 2. It is described how a path is torn down and a new path is established.

- ISR1 23 learns of a new path via ISR3 21 to the egress router 22. It removes the FIB entry for next hop ISR2 20 and egress router 22, and unsplices its ISR2 20 downstream VC 30 from its ISR4 24 upstream VC listed in the corresponding VCIB entry. It then creates a new FIB entry for the next hop ISR3 21 and egress router 22, as well as a new VCIB entry with a default VC to the next hop ISR3.
- ISR1 23 sends a 'VC Trigger' message to new downstream node ISR3 21.
- ISR3 21 creates an upstream VC 25, and replies with a 'VC Establish' message to ISR1 23, containing the full ISR ID path and the VC label 25 (VPI/VCI).
- ISR1 23 verifies that the 'VC Establish' message was received from the expected next hop (ISR3) 21, and that the ISR ID path is loop free. It then creates a new downstream VC to ISR3 21 with the given VC label 25, and replaces the default VC in the VCIB with this new value.
- ISR1 23 sends a 'VC Acknowledgment' message to ISR3 21.
- ISR3 21 receives the acknowledgment and splices its ISR1 23 upstream VC 25 to to its downstream VC 27.
- ISR1 23 appends its ISR ID to the 'VC Establish' message, and forwards the message to ISR4 24 with the upstream VC label 28 (VPI/VCI).
- ISR4 24 verifies the 'VC Establish' message, unsplices the current VC 28 to ISR1 23 from its upstream node(s), and sends a 'VC acknowledgment' to ISR1 23.
- ISR1 23 receives the acknowledgment and splices the ISR4 24 upstream VC 28 to the ISR3 21 downstream VC 25.
- ISR4 24 appends its ISR ID to the path, and forwards the 'VC establishment' message to its upstream neighbors (not shown) with a VC label 29. When ISR4 24 receives an acknowledgment from an upstream neighbor, it splices the upstream VC 29 to the ISR1 23 downstream VC 28.

All upstream nodes recursively follow the same procedure as ISR4 24, until all Ingress nodes have been updated.

Exemplary State Diagrams

Figure 5:
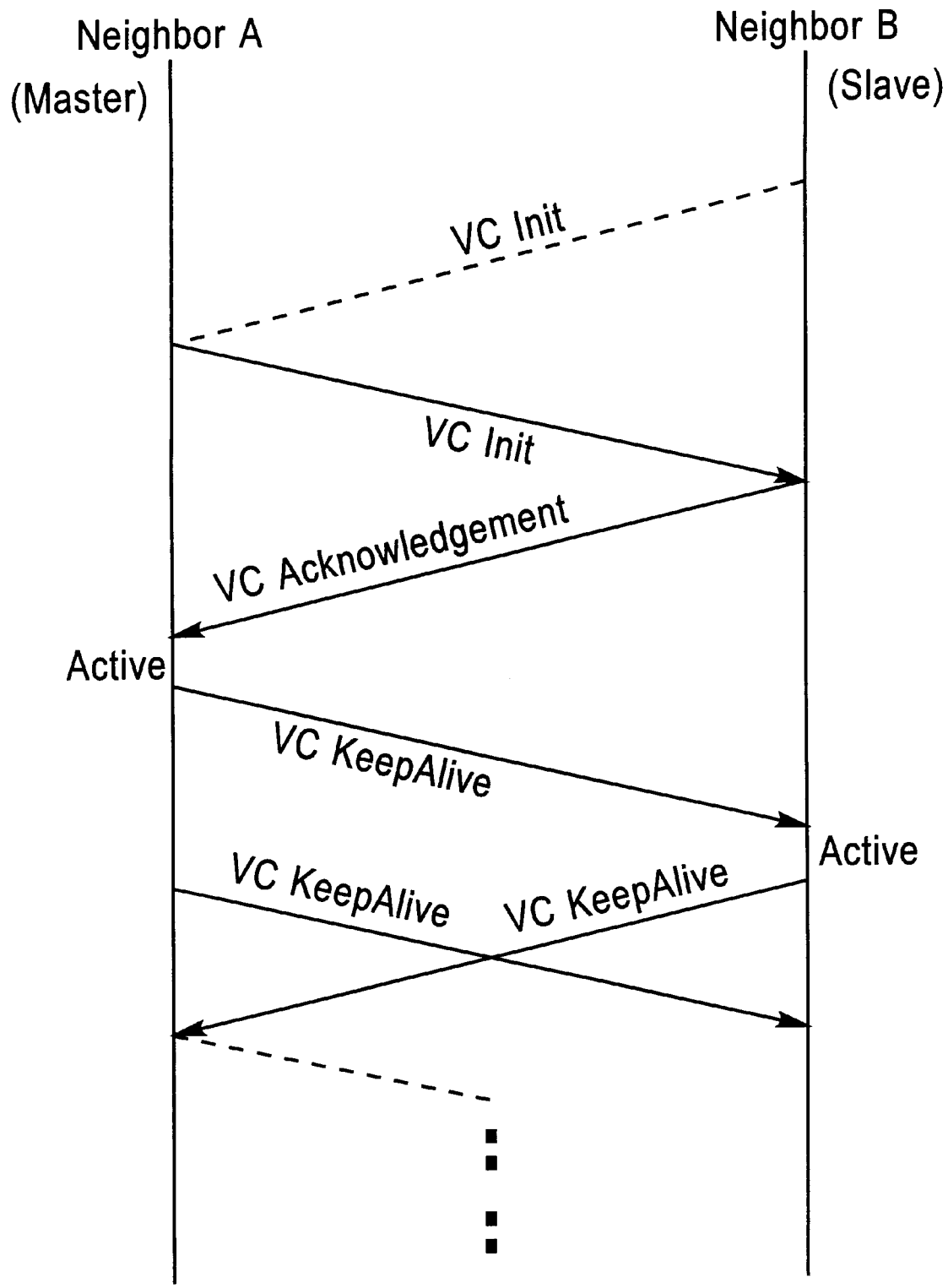
FIG. 5 is a state diagram used to illustrate one possible way of establishing neighbor adjacency, according to the present invention.

In FIG. 5 an example for the establishment of a neighbor adjacency is illustrated. In the present example, the transition assigns a 'master' neighbor and a 'slave' neighbor, where the master is the neighbor with the lower router ID. Please note that 'VC KeepAlive' messages are sent (at a pre-determined rate) after the adjacency has been established; 'VC Init' messages are sent (at a predetermined rate) when trying to establish adjacency.

Figure 6:
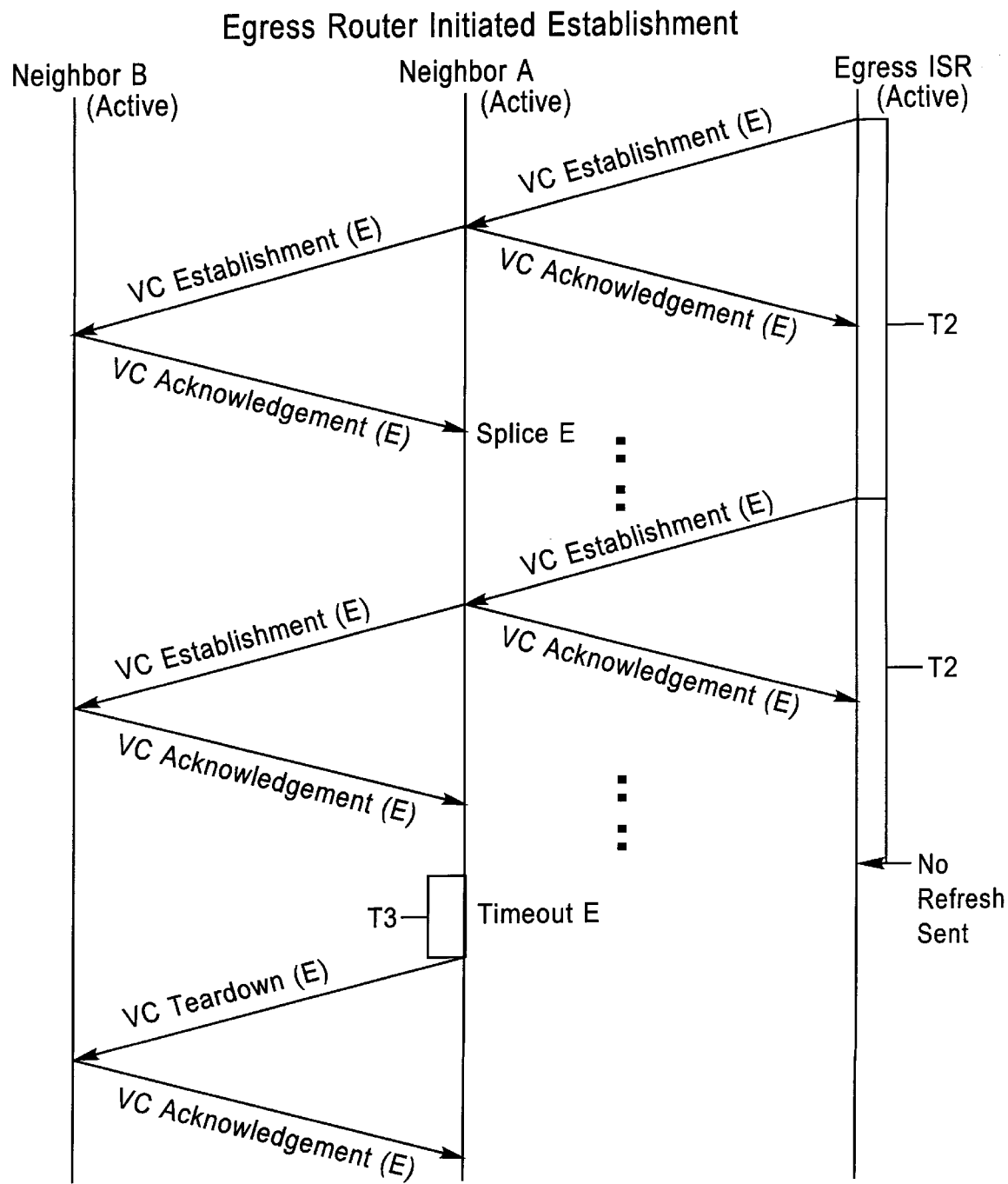
FIG. 6 is a state diagram used to illustrate an establishment initiated by an egress router, according to the present invention.

In FIG. 6 an example for an egress router initiated VC establishment is given. In this Figure, the egress identifier for which a VC is to be established is denoted by an (E). T2 is the rate at which the egress ISR sends Refresh Establishment messages. T3 is the time in which an egress identifier times-out (T3 &approx. T2*n).

Figure 7:
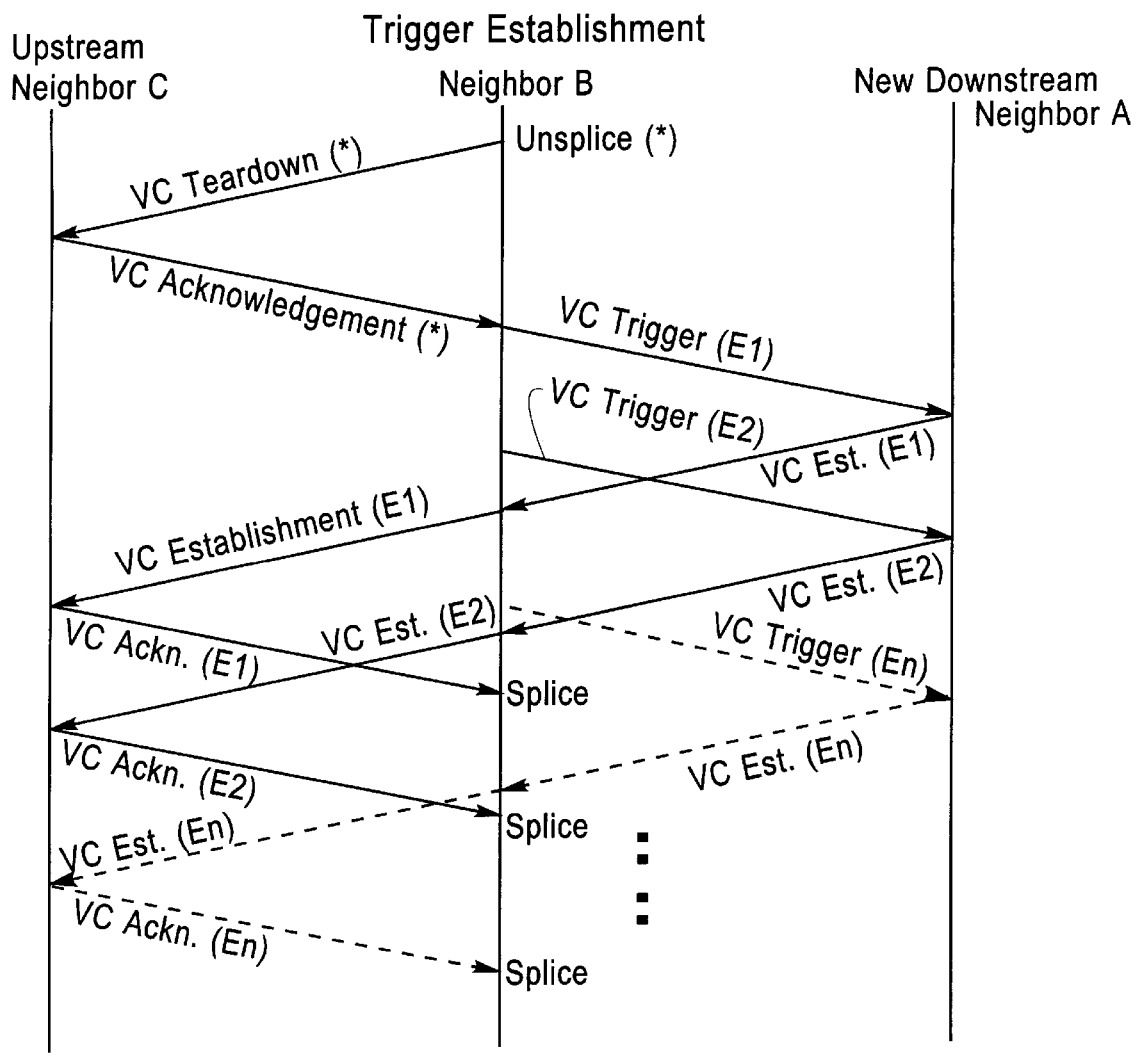
FIG. 7 is a state diagram used to illustrate a trigger establishment, according to the present invention.

An example for a trigger establishment is given in FIG. 7.

TTL Decrement

In order to comply with the requirements for IPv4 (version 4 of the Internet protocol) routers, the IP datagram Time-To_Live (TTL) field must be decremented on each hop it traverses. Currently, switched packets within ATM cannot decrement the TTL. However, the inventive scheme can imitate a TTL decrement by maintaining a hop-count per egress identifier. This hop-count is calculated by including a hop-count field in the 'VC Establish' message, which is incremented at each ISR as it traverses the upstream path.

Before forwarding a packet on a VC, an ingress ISR decrements the TTL by the hop-count plus one. If the decrement value is greater than or equal to the TTL of the packet, the packet is forwarded hop-by-hop.

An alternative method which may be used in connection with the inventive protocol to approximate the TTL is to use the length of the ISR ID list it maintains for each egress identifier. However, this method has the drawback that the TTL may be off by a length of one, depending if the egress identifier refers to an egress ISR, or the node past an egress ISR (see "Egress Identifiers"), as this information is unknown at the ingress.

Multipath Implementation of the Present Invention

Many IP routing protocols, such as OSPF, support the notion of equal-cost multipath routes, in which a router maintains multiple next hops for one destination prefix when two or more equal-cost paths to the prefix exist. Unfortunately, because of limitations in most ATM switching hardware, each path needs its own VC. Therefore, ingress ISRs may maintain a number of VCs to one egress ISR, each VC representing a different equal-cost path to the egress. In this case, the ingress ISR will make multipath decisions for traffic on behalf of all downstream ISRs.

According to the present invention, each ISR that receives multiple (legal) 'VC Establishment' messages from downstream ISRs with different paths to the same egress identifier can choose one of four different approaches for sending 'VC Establishment' messages upstream.

One approach is to send multiple 'VC Establishment' messages upstream, preserving multiple VCs to the egress ISR.

Each 'VC Establishment' message requires an additional numeric identifier to be able to distinguish multiple distinct VCs to the destination, so that successive 'VC Establishment' messages for distinct VCs are not misinterpreted as consecutive replacements of the same VC. When multiple 'VC establishment' VCs are preserved upstream, they require distinct VPI/VCI assignments, which works against conservation of VCs.

Another approach, according to the present invention, that conserves VCs at the cost of switching performance, is to originate one 'VC Establishment' message upstream, and to forward datagrams at the IP network layer on the multipath point ISR.

A third approach, according to the present invention, is to propagate only one 'VC Establishment' message from the downstream ISRs to the upstream ISRs, and ignore the content of other 'VC Establishment' messages. This conserves VCs and maintains switching performance, but may not balance loads across downstream links as well as the first two approaches, even if VCs are selectively dropped.

Yet another approach, according to the present invention, is to propagate one 'VC Establishment' message that carries the content of all downstream 'VC Establishment' messages, so that only one upstream VC is created to the multipath point. This requires that the ATM switching hardware on the multipath ISR be capable of correctly distributing the traffic of upstream VCs onto multiple downstream VCs. Furthermore, the 'VC Establishment' message to send upstream must concatenate the ISR ID lists from downstream messages, in order to preserve the VC loop-free property. The ISR ID list concatenation is similar to using AS_SETs for aggregation in the BGP protocol. This final approach has the benefit of both VC conservation and performance, although it requires a slightly more complex implementation.

In some circumstances, when equal-cost multipaths to egress identifiers exist, an ISR may act as an egress and non-egress ISR for the same egress identifier simultaneously.

In this case, the ISR might originate one or more 'VC Establishment' messages for itself, and propagate other 'VC Establishment' messages on behalf of other downstream egress ISRs.

BGP Interactions with the Present Protocol

The BGP implementation of the ISR uses the NEXT_HOP attribute as the egress identifier. When the BGP border ISR injects routes into the BGP mesh, it may use its own IP address or the address of its external BGP peer as the value of the NEXT_HOP attribute. This choice of NEXT_HOP attribute value creates different VC Establishment behaviors with the present protocol.

If the BGP border ISR uses its own IP address as the NEXT_HOP attribute in its injected routes, then all of these BGP routes share the same egress identifier. This approach establishes only one VC tree to the BGP border ISR, and the ISR must forward traffic at the IP layer towards its external BGP neighbors.

If the BGP border ISR uses the external BGP peer as the NEXT_HOP attribute in its injected routes, then the BGP routes from each unique external BGP neighbor share the same egress identifier. This approach establishes one VC tree per external BGP neighbor of the BGP border ISR. The BGP border ISR can switch traffic directly to its external BGP neighbors.

OSPF Router ID and other link state router labels One inventive aspect of the inventive signalling protocol is the use of the 'OSPF router ID' as a basis for aggregation of traffic on a single virtual circuit/path. In fact, this may be broadened to include the use of unique router 'labels', as required by link-state routing protocols, for aggregation of traffic destined to many destination prefixes on a minimal set of switched paths. Another example of the same technique would be to use the router network service access point (NSAP) address in the context of an IS-IS autonomous system. It is to be noted, that the Novell Netware NLSP routing protocol, for example, is deemed to have unique router "labels" that are keys in its Dijkstra calculation.

In any link state routing protocol domain, the unique router 'labels' (e.g. the 'OSPF router ID') allow a new level of destination prefix abstraction. In a typical network, a router may be connected to several LANs (Ethernets, Token Rings, etc.), and may communicate to remote networks outside of its routing domain via adjacent routers. The remote destination networks may be injected into the link state routing domain via static configuration, or via other routing protocols (such as RIP or BGP). These local and remote networks may be represented in the router forwarding tables as many destination prefixes, which cannot be aggregated into shorter prefixes (even when using CIDR—RFC 1519).

When a link state routing protocol implementation needs to calculate the shortest paths to all destinations (i.e. shortest path first; SPF), it performs the Dijkstra calculation on a topology map representing the connectivity of routers. The routers are identified in the topology map with their unique router labels (e.g. 'OSPF router IDs').

The destination prefixes are associated with the nodes in the topology map—some prefixes, such as LANs, will be identified as directly attached to nodes (e.g. stub networks), while other prefixes will be identified as externally injected into nodes (e.g. AS external routes). In all cases, router labels provide a compact means to represent a number of destination prefixes that exit the link state routing domain at the same egress router. The association between destination prefixes and router labels is an easy by-product of the normal SPF computation.

To summarize, the inventive technique is to minimize the number of switched paths in an network, by created switched paths on the basis of link state routing protocol router labels (e.g. 'OSPF router IDs'), instead of on the basis of unique destination prefixes (or some other basis).

OSPF Interactions with the Present Protocol

The OSPF protocol exchanges five types of 'link state advertisements' to create OSPF routing tables. All types of advertisements contain an 'Advertising Router' field, which identifies the OSPF Router ID of the router that originates the advertisement. According to the present invention, the ISR uses this OSPF Router ID as the egress identifier.

The one exception to using the OSPF Router ID is when ISRs receive an Autonomous System (AS) external link advertisement with a non-zero forwarding address. The OSPF protocol uses the forwarding address to allow traffic to bypass the router that originates the advertisement. Since the OSPF Router ID refers to the bypassed router, it is inadequate as an egress identifier in this case. Instead, the inventive protocol must use the forwarding address as the egress identifier.

Using the forwarding address as the egress identifier provides significant benefits. Since the AS external forwarding address and the BGP NEXT_HOP attribute are both external IP addresses, they are compatible types of egress identifiers, which may allow BGP and OSPF routes to share the same VC. Further, the OSPF AS boundary ISR can switch traffic directly to its external neighbors, just like BGP.

The ISR identifies itself as an OSPF egress when the ISR is an area border router or an AS boundary router, or when it is directly attached to a network.

BGP NEXT_HOP and Tag as Egress Identifier

The inventive protocol can extend beyond the edge of a BGP autonomous system domain with the inventive use of a 'tag' as introduced in the above mentioned document with title "Tag Switching Overview" of Davie et al. The 'tag' is a hint of the level of switching path aggregation possible, without having to perform standard network layer forwarding at the access router of a neighboring AS. While BGP-derived routes with the same BGP NEXT_HOP address will enter the neighbor AS at the same access router, routes with the same BGP NEXT_HOP address and tag may be switched uniformly to and across the neighbor AS. Please note that the use of the BGP NEXT_HOP address and tag as an egress identifier allows for the aggregation of traffic flows onto a minimal number of switching paths, with inter-AS switching possible, without requiring a 'tag stack' as in the scheme described by Davie et al.

IP Multicast Interactions with the Present Protocol

The inventive protocol can be used to setup VCs for IP multicast traffic, in particular for multicast protocols using Reverse Path Multicasting (RPM). The typical RPM forwarding information base maps a source IP network address and multicast group pair, (S,G), to an expected incoming interface and a set of outgoing interfaces. The ISR extends the forwarding information base to include one egress identifier per (S,G).

The current choice of egress identifier is the (S,G) pair itself. This egress identifier creates one source-based VC tree per source address and group pair. The VC tree carries traffic from the ingress ISR(s) to all egress ISRs, using multicast switching within intermediate ISRs. Egress ISRs for multicast are similar to egress ISRs for the unicast case, except that multicast egress ISRs are determined by group membership location, instead of egress point reachability. An ISR becomes an egress for a particular (S,G) when it forwards traffic from a source S to a group G over a non-ISR link.

Having multicast VCs set up on the basis of (S,G) works well with version 3 of the Internet Group Management Protocol (IGMPv3) Group-Source messages, since these IGMP messages can create unique trees for each sender within the same group.

An alternative egress identifier choice is to use the "ingress" of the source address S in the (S,G) pair. This choice creates one ingress-based VC tree per group, which permits a greater amount of VC aggregation in the ISR cloud. The ingress of a source address is calculated in a similar fashion to calculating an egress identifier for a destination prefix. Unfortunately, one cannot calculate useful ingress identifiers for DVMRP, for the same reason that one cannot calculate useful egress identifiers for RIP. Furthermore, since some protocols permit source-specific multicast pruning, the multicast distribution tree for a particular group may differ according to source address, even if sources share the same ingress point. However, the advantages this approach offers with regards to VC conservation on those protocols capable of supporting the ingress of source may outweigh the disadvantage of wasting bandwidth by sending traffic to leaf networks where a particular source may be filtered. Based on the topology of the multicast distribution tree, there may be multiple egress ISRs for the egress identifier (S,G). Each ISR can send one multicast VC Establishment message to the one upstream ISR on the path back toward the source address. The ISR ID lists of multicast downstream ISRS, with the current ISR ID, are concatenated (like BGP AS_SETs) before sending the 'VC Establishment' message to the upstream ISR.

The observant reader may note that the present invention uses a multicast scheme to build unicast VCs, and a unicast scheme to build multicast VCs.

Virtual Path Extension

The present protocol's usage of 'merged' VC flows requires the ATM switching hardware to reassemble and re-segment ATM cells to prevent frame interleaving (see "VC Conservation"). Unfortunately, much of the existing ATM switching hardware cannot support VC merging. One solution to this problem is to use virtual paths (VPs) to egress points, rather than virtual circuits (VCs). The virtual path extension merges VPs, creating trees of VPs to the egress points, instead of merging VCs. Frame interleaving is prevented by the assignment of unique VC identifiers (VCIs) within each VP.

The ISRs within a network are assigned unique VCIs to prevent VP merging collisions between different ISRs. Each ISR requires a block of VCIs as labels to distinguish between cells on different paths to the same egress identifier. By assigning a unique block of VCIs to each ISR, the inventive scheme guarantees that an ISR at a network merge point can safely merge upstream VP flows for an egress identifier to a single downstream VP without VCI collisions.

Although the virtual path extension uses VCs much less efficiently than a VC merging implementation, it reduces network latency and hardware requirements because frame reassembly and re-segmentation is not required on intermediate ISRs.

Multiprotocol Support

A number of multiprotocol strategies are possible with the inventive protocol, since many network layer technologies (IP; Connectionless Network Protocol, CLNP; Internetwork Packet exchange, IPX) use link state routing protocols. In particular, integrated IS-IS can calculate routes for CLNP, IP4, and IP6 simultaneously (with one Dijkstra calculation), and OSPFv3 (the new draft of OSPF) can calculate routes for IP4 and IP6 simultaneously. Both integrated IS-IS and OSPFv3 use a single router label to represent a single router that supports multiple network layer protocols. In this context, the inventive protocol can minimize switching paths by using a single switching path for traffic from multiple network protocols destined to the same egress multiprotocol router.

Upstream VC Label Allocation Enhancement

The inventive protocol defines the downstream ISR as the allocator of VC labels (VPI/VCI), which are forwarded upstream in the 'VC Establishment' messages. An enhancement to the inventive protocol alternatively allows an upstream neighbor to allocate the VC label assignment. Neighbors may exchange their acceptable VC ranges and indicate whether they wish to be an upstream allocator of VC labels.

When a downstream neighbor forwards a 'VC Establishment' message to an 'upstream-allocator', it leaves the VC label blank. The upstream neighbor allocates the VC label from the downstream range it previously learned from its neighbor, and returns the label in the 'VC Acknowledgment' message.

The inventive protocol and Frame Switching Technology

As already mentioned, the inventive protocol is easily extendable to other switching environments. Though the present document illustrates its use and implementation in an ATM cell switching environment, it can be extended to other switching technologies. In fact, the present invention applies well to frame switching technology such as Frame Relay, X.25, and CISCO tag switching, for example.

While the present invention solves the problem of cell interleaving in the case of ATM by Virtual Path switching (in which either a good number of VCIs may be left unused, or a scheme to reuse the VCIs in another context must be devised), it more naturally and easily maps to a frame relay environment. This is due to the fact that in frame switching multiple upstream flows can be merged into a single downstream flow without worrying about the problems of cell interleaving.

In the case of LAN switching technologies, such as Ethernet, which do not have a Layer 2 label space, the network layer packet can be encapsulated in an intermediatary layer that contains the pseudo Layer 2 label, while the inventive protocol can be used as the signalling protocol to determine the VC information.

Alternative Trigger Method

An alternative to sending the 'VC Trigger' message to a new next hop is to send the 'VC Trigger' message down the full path to the Egress ISR of the egress identifier. In this case, the Egress ISR (which may or may not be the same as the egress identifier), issues a refresh 'VC Establishment' message to upstream neighbors, with a sequence number that is unique for the Egress ISR. This approach re-establishes the VC and eliminates need for the 'unsplice and splice' technique used to avoid VC loops when the trigger is only sent to the next hop.

A loop can be formed primarily in two ways: a 'VC Establishment' message that loops because it is following the path of an IP loop, or because an obsolete 'VC Establishment' message is being forwarded. The former is solved by the ISR ID list. The latter is solved by the unique sequence number injected by the Egress ISR. This ensures that the 'VC Establishment' message is not obsolete when the Egress ISR sequence number is greater than the previous one received.

Quality of Service

The current invention can be extended to support Quality of Service (QoS) parameters. This can be achieved by simply adding a QoS object in the 'VC Establishment' message.

Its possible to support an Available Bit Rate (ABR) type of QoS for the VCs for best-effort traffic. The inventive protocol can also be extended to interact with Resource reSerVation Protocol (RSVP) on a peer basis. The RSVP "sessions" and/or RSVP "reservations" can be mapped to existing or new Egress Identifiers and QoS information is carried and setup by the inventive protocol.

Exemplary Message Formats, According to the Present Invention

Please note that the following examples are shown in the context of IPv4.

Extensions to other protocols (such as IPv6 or IPX) are trivial and obvious.

Common Header

Messages, according to the present protocol, begin with the following header:

```
 7 6 5 4 3 2 1 0 7 6 5 4 3 2 1 0 7 6 5 4 3 2 1 0 7 6 5 4 3 2 1 0
+-+-+-+-+-+-+-+-+-+-+-+-+-+-+-+-+-+-+-+-+-+-+-+-+-+-+-+-+-+-+-+-+-
       Version          Msg Type              Length
+-+-+-+-+-+-+-+-+-+-+-+-+-+-+-+-+-+-+-+-+-+-+-+-+-+-+-+-+-+-+-+-+-
            Header Checksum             Reserved
+-+-+-+-+-+-+-+-+-+-+-+-+-+-+-+-+-+-+-+-+-+-+-+-+-+-+-+-+-+-+-+-+-
                        Sender Router ID
+-+-+-+-+-+-+-+-+-+-+-+-+-+-+-+-+-+-+-+-+-+-+-+-+-+-+-+-+-+-+-+-+-
                     Sender Sequence Number
```

Version

Version number of the present protocol, currently 1.

Msg Type

Defines the type of the protocol message, as follows:

INIT=1
KEEPALIVE=2
TRIGGER=3
ESTABLISH=4
TEARDOWN=5
ACKNOWLEDGE=6

Length

Total length in octets of the protocol message, including this header.

Header Checksum

IP style checksum of the complete protocol message, that includes the protocol Common Header and all the objects therein.

Sender Router ID

Sender router identifier

Sender Sequence Number

Sequence number of the sender.

Common Object Header

All objects in the message, according to the present protocol, start with the following object header. The objects are placed back-to-back within the protocol message.

```
 7 6 5 4 3 2 1 0 7 6 5 4 3 2 1 0 7 6 5 4 3 2 1 0 7 6 5 4 3 2 1 0
+-+-+-+-+-+-+-+-+-+-+-+-+-+-+-+-+-+-+-+-+-+-+-+-+-+-+-+-+-+-+-+-+-
       Obj Type     Sub Type                Length
+-+-+-+-+-+-+-+-+-+-+-+-+-+-+-+-+-+-+-+-+-+-+-+-+-+-+-+-+-+-+-+-+-
```

Object Type

Object type of this object. Currently the following objects are defined:

L2_LABEL
EGRESS_ID
MULTIPATH
INIT_MSG
ESTABLISH_MSG
ACKNOWLEDGE_MSG

Sub Type

Sub type of the object. See object definitions for sub types of an object.

Length

Length of the object in octets, including this header.

L2 Label Object

The selected L2 label.

Obj Type=1, Sub Type=1

```
 7 6 5 4 3 2 1 0 7 6 5 4 3 2 1 0 7 6 5 4 3 2 1 0 7 6 5 4 3 2 1 0
+-+-+-+-+-+-+-+-+-+-+-+-+-+-+-+-+-+-+-+-+-+-+-+-+-+-+-+-+-+-+-+-+-
       Res              VPI                      VCI
+-+-+-+-+-+-+-+-+-+-+-+-+-+-+-+-+-+-+-+-+-+-+-+-+-+-+-+-+-+-+-+-+-
```

Res

Reserved.

VPI (12 bits)

Virtual Path Identifier. If VPI is less than 12-bits it should be right justified in this field and the leading bits should be set to zero.

VCI (16 bits)

Virtual Connection Identifier. If the VCI is less than 16-bits, it should be right justified in the field and the leading bits must be set to zero.

Egress ID Object

This object contains the egress identifier, in any one of the following formats:

Obj Type=2, Sub Type=1

```
 7 6 5 4 3 2 1 0 7 6 5 4 3 2 1 0 7 6 5 4 3 2 1 0 7 6 5 4 3 2 1 0
+-+-+-+-+-+-+-+-+-+-+-+-+-+-+-+-+-+-+-+-+-+-+-+-+-+-+-+-+-+-+-+-+-
                Reserved                         Premix Len
+-+-+-+-+-+-+-+-+-+-+-+-+-+-+-+-+-+-+-+-+-+-+-+-+-+-+-+-+-+-+-+-+-
                          IPv4 Address
+-+-+-+-+-+-+-+-+-+-+-+-+-+-+-+-+-+-+-+-+-+-+-+-+-+-+-+-+-+-+-+-+-
```

Prefix Len

Number of significant bits of the IPv4 Network Address field.

IPv4 Address

Egress identifier represented by an IPv4 Network address.

Obj Type=2, Sub Type=2

```
 3                   2                   1                   0
7 6 5 4 3 2 1 0 7 6 5 4 3 2 1 0 7 6 5 4 3 2 1 0 7 6 5 4 3 2 1 0
+-+-+-+-+-+-+-+-+-+-+-+-+-+-+-+-+-+-+-+-+-+-+-+-+-+-+-+-+-+-+-+-+
|                          OSPF Router Id                       |
+-+-+-+-+-+-+-+-+-+-+-+-+-+-+-+-+-+-+-+-+-+-+-+-+-+-+-+-+-+-+-+-+
```

OSPF Router ID
   Router identifier of the OSPF node.
   Obj Type=2, Sub Type=3

```
 3                   2                   1                   0
7 6 5 4 3 2 1 0 7 6 5 4 3 2 1 0 7 6 5 4 3 2 1 0 7 6 5 4 3 2 1 0
+-+-+-+-+-+-+-+-+-+-+-+-+-+-+-+-+-+-+-+-+-+-+-+-+-+-+-+-+-+-+-+-+
|             Reserved                    |      Prefix Len     |
+-+-+-+-+-+-+-+-+-+-+-+-+-+-+-+-+-+-+-+-+-+-+-+-+-+-+-+-+-+-+-+-+
|                        IPv4 Network Address                   |
+-+-+-+-+-+-+-+-+-+-+-+-+-+-+-+-+-+-+-+-+-+-+-+-+-+-+-+-+-+-+-+-+
|                      OSPF Area Border Router ID               |
+-+-+-+-+-+-+-+-+-+-+-+-+-+-+-+-+-+-+-+-+-+-+-+-+-+-+-+-+-+-+-+-+
```

Prefix Len
   Number of significant bits of the IPv4 Network Address field.
IPv4 Network Address
   Network Address.
OSPF Area Border Router ID
   Router identifier of the OSPF ABR node.
   Obj Type=2, Sub Type=4

```
7 6 5 4 3 2 1 0 7 6 5 4 3 2 1 0 7 6 5 4 3 2 1 0 7 6 5 4 3 2 1 0
+-+-+-+-+-+-+-+-+-+-+-+-+-+-+-+-+-+-+-+-+-+-+-+-+-+-+-+-+-+-+-+-+
|                         IPv4 Source Address                   |
+-+-+-+-+-+-+-+-+-+-+-+-+-+-+-+-+-+-+-+-+-+-+-+-+-+-+-+-+-+-+-+-+
|                      IPv4 Multicast Group Address             |
+-+-+-+-+-+-+-+-+-+-+-+-+-+-+-+-+-+-+-+-+-+-+-+-+-+-+-+-+-+-+-+-+
```

IPv4 Source Address
   Source IPv4 address of the multicast stream.
IPv4 Multicast Group Address
   IPv4 Multicast Group Address.
   Obj Type=2, Sub Type=5

```
7 6 5 4 3 2 1 0 7 6 5 4 3 2 1 0 7 6 5 4 3 2 1 0 7 6 5 4 3 2 1 0
+-+-+-+-+-+-+-+-+-+-+-+-+-+-+-+-+-+-+-+-+-+-+-+-+-+-+-+-+-+-+-+-+
|                         IPv4 Ingress Address                  |
+-+-+-+-+-+-+-+-+-+-+-+-+-+-+-+-+-+-+-+-+-+-+-+-+-+-+-+-+-+-+-+-+
|                      IPv4 Multicast Group Address             |
+-+-+-+-+-+-+-+-+-+-+-+-+-+-+-+-+-+-+-+-+-+-+-+-+-+-+-+-+-+-+-+-+
```

IPv4 Ingress Address
   IPv4 ingress ISR address of the source of the multicast stream.
IPv4 Multicast Group Address
   IPv4 Multicast Group Address.
Multipath Identifier Object
   Obj Type=3, Sub Type=1

```
 3                   2                   1                   0
7 6 5 4 3 2 1 0 7 6 5 4 3 2 1 0 7 6 5 4 3 2 1 0 7 6 5 4 3 2 1 0
+-+-+-+-+-+-+-+-+-+-+-+-+-+-+-+-+-+-+-+-+-+-+-+-+-+-+-+-+-+-+-+-+
```

-continued

```
|                         Multipath Identifier                  |
+-+-+-+-+-+-+-+-+-+-+-+-+-+-+-+-+-+-+-+-+-+-+-+-+-+-+-+-+-+-+-+-+
```

Multipath Identifier
   A randomly selected value, but assured to be unique in the recent past.
Init Message Object
   Obj Type=4, Sub Type=1

```
7 6 5 4 3 2 1 0 7 6 5 4 3 2 1 0 7 6 5 4 3 2 1 0 7 6 5 4 3 2 1 0
+-+-+-+-+-+-+-+-+-+-+-+-+-+-+-+-+-+-+-+-+-+-+-+-+-+-+-+-+-+-+-+-+
|                         Neighbor Dead Interval                |
+-+-+-+-+-+-+-+-+-+-+-+-+-+-+-+-+-+-+-+-+-+-+-+-+-+-+-+-+-+-+-+-+
|   UP   |   Minimum VPI      |         Minimum VCI             |
+-+-+-+-+-+-+-+-+-+-+-+-+-+-+-+-+-+-+-+-+-+-+-+-+-+-+-+-+-+-+-+-+
|   Res  |   Maximum VPI      |         Maximum VCI             |
+-+-+-+-+-+-+-+-+-+-+-+-+-+-+-+-+-+-+-+-+-+-+-+-+-+-+-+-+-+-+-+-+
```

Neighbor Dead Interval
   The maximum number of seconds the destination will wait to receive a protocol message from the sender, before declaring it down.
UP
   A Boolean field indicating whether the sender is requesting to be an upstream VC-label allocator.
Min VPI (12 bits)
   Minimum Virtual Path Identifier that may be allocated to the sender; this is used when the destination becomes an upstream VC-label allocator.
   If VPI is less than 12-bits it should be right justified in this field and the leading bits should be set to zero.
Min VCI (16 bits)
   Minimum Virtual Connection Identifier that may be allocated to the sender; this is used when the destination becomes an upstream VC-label allocator.
   If VCI is less than 16-bits it should be right justified in this field and the leading bits should be set to zero.
Res
   Reserved.
Max VPI (12 bits)
   Maximum Virtual Path Identifier that may be allocated to the sender; this is used when the destination becomes an upstream VC-label allocator.
   If VPI is less than 12-bits it should be right justified in this field and the leading bits should be set to zero.
Max VCI (16 bits)
   Maximum Virtual Connection Identifier that may be allocated to the sender; this is used when the destination becomes an upstream VC-label allocator.
   If VCI is less than 16-bits it should be right justified in this field and the leading bits should be set to zero.
Establish Message Object
   Obj Type=5, Sub Type=1

```
7 6 5 4 3 2 1 0 7 6 5 4 3 2 1 0 7 6 5 4 3 2 1 0 7 6 5 4 3 2 1 0
+-+-+-+-+-+-+-+-+-+-+-+-+-+-+-+-+-+-+-+-+-+-+-+-+-+-+-+-+-+-+-+-+
|                       Establish Refresh Interval              |
+-+-+-+-+-+-+-+-+-+-+-+-+-+-+-+-+-+-+-+-+-+-+-+-+-+-+-+-+-+-+-+-+
|                              Router Id 0                      |
+-+-+-+-+-+-+-+-+-+-+-+-+-+-+-+-+-+-+-+-+-+-+-+-+-+-+-+-+-+-+-+-+
|                              Router Id n                      |
```

-continued

```
+-+-+-+-+-+-+-+-+-+-+-+-+-+-+-+-+-+-+-+-+-+-+-+-+-
```

Establish Refresh Interval Rate (in seconds) at which the egress router will resend an establish for the corresponding egress identifier object. The destination will time out the egress identifier if it has not received a new establish within the interval.
Router Id 0
Router Identifier of the first router that originated the message.
Router Id 1 to (n-1)
An ordered series of Router Identifiers indicating the upstream path of the VC establishment message.
Router Id n
Router Identifier of the router that sent the current message. This must be an adjacent router.
Obj Type=5, Sub Type=2

```
 7 6 5 4 3 2 1 0 7 6 5 4 3 2 1 0 7 6 5 4 3 2 1 0 7 6 5 4 3 2 1 0
+-+-+-+-+-+-+-+-+-+-+-+-+-+-+-+-+-+-+-+-+-+-+-+-+-+-+-+-+-+-+-+-+
                         Establish Refresh Interval
+-+-+-+-+-+-+-+-+-+-+-+-+-+-+-+-+-+-+-+-+-+-+-+-+-+-+-+-+-+-+-+-+
                              Router Id 0
~                                                                ~
+-+-+-+-+-+-+-+-+-+-+-+-+-+-+-+-+-+-+-+-+-+-+-+-+-+-+-+-+-+-+-+-+
                              Router 14 n
+-+-+-+-+-+-+-+-+-+-+-+-+-+-+-+-+-+-+-+-+-+-+-+-+-+-+-+-+-+-+-+-+
```

Establish Refresh Interval Maximum rate (in seconds) of all merged multicast establish refresh rates, for the corresponding egress identifier, The destination will time out the egress identifier if it has not received a new establish within the interval.
Router Id 0 to n
An unordered list of merged downstream multicast Routers Identifiers.
Acknowledge Message Object
  Obj Type=6, Sub Type=1

```
 7 6 5 4 3 2 1 0 7 6 5 4 3 2 1 0 7 6 5 4 3 2 1 0 7 6 5 4 3 2 1 0
+-+-+-+-+-+-+-+-+-+-+-+-+-+-+-+-+-+-+-+-+-+-+-+-+-+-+-+-+-+-+-+-+
                       Acknowledge Sequence Number
+-+-+-+-+-+-+-+-+-+-+-+-+-+-+-+-+-+-+-+-+-+-+-+-+-+-+-+-+-+-+-+-+
     Obj Type           Error                 Reserved
+-+-+-+-+-+-+-+-+-+-+-+-+-+-+-+-+-+-+-+-+-+-+-+-+-+-+-+-+-+-+-+-+
```

Acknowledge Sequence Number
The sequence number of the originating message that is being acknowledged.
Obj Type
Type of message being acknowledged Error
An Error Code Message Formats (in BNF notation)
All routers will generate messages with the objects in the order mentioned below. But all routers will parse messages with objects in any order they occur (note that the Common Header is not an object and has to appear as shown below).
<Init Message>::=<Common Header>
<Object Header><INIT_MSG>
<KeepAlive Message>::=<Common Header>
<Establish Message>::=<Common Header>
<Object Header><EGRESS_ID>
<Object Header><L2_LABEL>
<Object Header><MULTIPATH>
<Object Header><ESTABLISH_MSG>
<Object Header><L2_LABEL>
<Object Header><MULTIPATH>
<Object Header><ESTABLISH_MSG>)
<Trigger Message>::=<Common Header>
<Object Header><EGRESS_ID>
<Tear Message>::=<Common Header>
<Object Header><EGRESS_ID>
<Object Header><L2_LABEL>
<Object Header><MULTIPATH>
<Object Header><EGRESS_ID>
<Object Header><L2_LABEL>
<Object Header><MULTIPATH>
<Ack Message>::=<Common Header>
<Object Header><ACKNOWLEDGE_MSG>
<Object Header><L2_LABEL>

General Remarks

It is to be noted that the present invention can also be used in packet-switched networks other than ATM networks.

The present invention allows a staggered implementation and thus can be deployed step-by-step. Based on the environment in which the present invention is to be used, and depending on other criteria, it may be favorable to make use of all, or only some aspects of the inventive scheme.

Current ATM hardware can be used if one installs new software modules designed to handle and manage the inventive protocol. Likewise, new hardware can be provided that is specially designed to cope with the different task imposed upon by the inventive protocol. Ideally, all routers within one domain are ISRs configured to handle protocol specific tasks.

In addition to special routers, one may provide hubs, switches, adapter cards and the like specially designed or configured to ensure proper handling and control of the protocol specific tasks.

It is also conceivable to provide special tools, such as a network sniffer for example, which allows to track the traffic in a network, according to the present invention. Other tools, such as debuggers, may be provided that simplify the management of a such network.

Comparisons with other IP Switching Techniques

The inventive scheme has many advantages over other similar types of competitive solutions.

Known ATM implementations have problems with scaling, suboptimal performance, complexity, and evolving ATM standards. Some of the ATM implementations are quite complex in design, which can affect code maintenance and interoperability.

Other solution using IP routing information to determine VC paths, as does the present scheme, are not very stable. In addition, some of the TCP session based VCs are not optimal for short lived sessions, such as http for the World Wide Web. TCP session based VCs also create many more VCs than the present scheme due to their source and destination derivation.

Other approaches show only suboptimal performance.

Although illustrative embodiments of the invention have been described herein, it will be apparent to persons skilled in the networking field that changes and modifications can be made without departing from the scope and spirit of the present invention as set forth in the appended claims.

What is claimed is:

1. A switching apparatus for receiving and transmitting data units each segmented into a series of cells of data, including a first cell and a last cell, each cell of a series comprising a label common to all cells of said series, said apparatus comprising:

a) at least one incoming port for receiving cells of a plurality of series at each incoming port, b) at least one outgoing port for transmitting cells out of the apparatus with an outbound label, c) a storage device for storing a series of cells received at each incoming port until the last cell of said series is received, and, d) a switching device for selectively receiving one or a plurality of said series of cells and transmitting each said series of cells sequentially from the first cell to the last cell from said storage device to a selected outgoing port, each cell of each series having an outbound label common to all cells of said series, all cells of each said series being transmitted before transmitting any cells of other series having the same outbound label.

2. A switching apparatus as set forth in claim 1 wherein cells of a series are stored in said storage device only while the selected outgoing port is busy transmitting cells of other series with the same outgoing label.

3. A switching apparatus for receiving and transmitting data units each segmented into a series of cells of data, including a first cell and a last cell, each cell of a series comprising a label common to all cells of said series, said apparatus comprising:

a) at least one incoming port for receiving cells of a plurality of series at each incoming port;

b) at least one outgoing port for transmitting cells out of the apparatus, c) a storage device for storing and reassembling a series of cells received at each incoming port until the last cell of said series is received, and, d) a switch device for selectively receiving one or a plurality of said series of cells and switching said reassembled cells from said storage device to an outgoing port.

4. A switching apparatus for receiving and transmitting data units each segmented into a series of cells of data, including a first cell and a last cell, each cell of a series comprising a label common to all cells of said series, said apparatus comprising:

a) at least one incoming port for receiving cells of a plurality of series at each incoming port;

b) at least one outgoing port for transmitting cells out of the apparatus, c) a switching device for selectively receiving one or a plurality of said series of cells and switching cells to an outgoing port selected according to said label common to all cells of said series, d) a storage device for storing and reassembling a series of cells received at each outgoing port until the last cell of said series is received, and, e) a transmitter for transmitting said reassembled cells from said apparatus on said outgoing port.

5. An apparatus as set forth in claim 1, 2, 3, or 4 wherein said data unit comprises an Internet Protocol (IP) packet.

6. An apparatus as set forth in claim 1, 2, 3, or 4 wherein said data unit comprises an ATM adaptation layer (AAL5) frame.

7. An apparatus as set forth in claim 1, 2, 3, or 4 wherein said data unit comprises a data-link layer frame or a frame-relay frame.

8. An apparatus as set forth in claim 1, 2, 3, or 4 wherein said cell comprises a data-link layer frame or a frame-relay frame.

9. An apparatus as set forth in claim 1, 2, 3, or 4 wherein said cells are fixed-size Asynchronous Transfer Mode (ATM) cells or are cells of variable sizes.

10. A method of creating a multipoint-to-point switched connection within a network of nodes to switch data units using labels, wherein a node comprises a plurality of incoming ports, at least one outgoing port, and a switching database, said method comprising:

a) assigning, by said node, a single outgoing label on an outgoing port for said switched connection, b) assigning, by said node, an incoming label on a plurality of incoming ports for said switched connection, and c) creating, by said node, a mapping in the switching database between each said incoming label and said outgoing label, thereby selectively creating said multipoint-to-point switched connection.

11. A method as set forth in claim 10, wherein said switched connection comprises a concatenation of Asynchronous Transfer Mode (ATM) Virtual Channels (VCs), said label is comprised of a Virtual Path Identifier (VPI) and a Virtual channel Identifier(VCI), and said data unit comprises an ATM cell.

12. A method as set forth in claim 10, wherein said switched connection comprises a Frame Relay connection, said label is comprised of a Data-Link control Identifier (DLCI), and said data unit comprises a Frame Relay frame.

13. A method of using a virtual Path (VP) switched connection in a multipoint-to-point connection to switch a series of cells in a network of nodes using a label, wherein said label is comprised of a Virtual Path Identifier (VPI) and a Virtual Channel Identifier (VCI), and wherein each node which is to initiate data on said VP switched connection is assigned a Virtual Channel Identifier (VCI) unique within said network, said method comprising:

a) transmitting, by a node initiating data on said VP switched connection, cells with said unique VCI value and the assigned VPI value for said connection, b) selectively receiving a plurality of cells at at least one incoming port of the switched connection, and c) switching, by each node in said network along said switched connection, cells based solely on said VPI value, and keeping the VCI value unaltered.

14. A method as set forth in claim 13, wherein the unique VCI identifier is derived from the lower 16 bits of a class B or C Internet Protocol (IP) version 4 address on said node, and wherein all nodes in said network belong to the same class B or C network.

15. A program storage device readable by a computing machine, tangibly embodying a program of instructions executable by the machine to perform method steps of a method of creating a multipoint-to-point switched connection within a network of nodes to switch data units using labels, wherein a node comprises a plurality of incoming ports, at least one outgoing port, and a switching database, said method comprising:

a) assigning, by said node, a single outgoing label on an outgoing port for said switched connection, b) assigning, by said node, an incoming label on a plurality of incoming ports for said switched connection, and c) creating, by said node, a mapping in the switching database between each said incoming label and said outgoing label, thereby selectively creating said multipoint-to-point switched connection.

16. A program storage device as set forth in claim 15, wherein said switched connection comprises a concatenation of Asynchronous Transfer Mode (ATM) Virtual Channels (VCs), said label comprises a Virtual Path Identifier (VPI) and a Virtual Channel Identifier (VCI), and said data unit comprises an ATM cell.

17. A program storage device as set forth in claim 15, wherein said switched connection comprises a Frame Relay connection said label comprises a Data-Link Control Identifier (DLCI), and said data unit comprises a Frame Relay frame.

18. A program storage device readable by a computing machine, tangibly embodying a program of instructions executable by the machine to perform method steps of a method of using a Virtual Path (VP) switched connection in a multipoint-to-point connection to switch a series of cells in a network of nodes using a label, wherein said label comprises a virtual Path Identifier (VPI) and a Virtual Channel Identifier(VCI), and wherein each node which is to initiate data on said VP-switched connection is assigned a virtual channel Identifier (VCI) unique within said network, comprising:

a) transmitting, by a node initiating data on said VP switched connection, cells with said unique VCI value and the assigned VPI value for said connection, b) selectively receiving a plurality of cells at at least one incoming port of the switched connection, and c) switching, by each node in said network along said switched connection, cells based solely on said VPI value, and keeping the VCI value unaltered.

19. A program storage device as set forth in claim 18 wherein the unique VCI identifier is derived from the lower 16 bits of a class B or C Internet Protocol (IP) version 4 address on said node, and wherein all nodes in said network belong to the same class B or C network.

20. The switching apparatus according to claim 1, wherein said switching device contains said storage device.

21. The switching apparatus according to claim 3, wherein said switching device contains said storage device.

22. The switching apparatus according to claim 4, wherein said switching device contains said storage device.

* * * * *